United States Patent
Minabe et al.

(10) Patent No.: US 7,826,114 B2
(45) Date of Patent: Nov. 2, 2010

(54) HOLOGRAM RECORDING APPARATUS, HOLOGRAM RECORDING METHOD AND OPTICAL RECORDING MEDIUM

(75) Inventors: Jiro Minabe, Kanagawa (JP); Yasuhiro Ogasawara, Kanagawa (JP); Shin Yasuda, Kanagawa (JP); Katsunori Kawano, Kanagawa (JP); Koichi Haga, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 545 days.

(21) Appl. No.: 11/790,016

(22) Filed: Apr. 23, 2007

(65) Prior Publication Data

US 2008/0030821 A1 Feb. 7, 2008

(30) Foreign Application Priority Data

Aug. 7, 2006 (JP) .............................. 2006-214460
Jan. 22, 2007 (JP) .............................. 2007-011517

(51) Int. Cl.
*G03H 1/16* (2006.01)
(52) U.S. Cl. .......................................... 359/29; 359/21
(58) Field of Classification Search ................... 359/21, 359/22, 29; 382/248
See application file for complete search history.

(56) References Cited

U.S. PATENT DOCUMENTS

| | | | | |
|---|---|---|---|---|
| 6,108,110 A | * | 8/2000 | Orlov et al. | 359/22 |
| 6,549,664 B1 | * | 4/2003 | Daiber et al. | 382/232 |
| 2006/0082851 A1 | * | 4/2006 | Toishi | 359/35 |
| 2007/0147801 A1 | * | 6/2007 | Yasuda et al. | 386/126 |
| 2007/0247687 A1 | * | 10/2007 | Handschy et al. | 359/35 |

OTHER PUBLICATIONS

Qiang Gao et al., Improvement to Holographic Digital Data-Storage Systems With Random and Psuedorandom Phase Masks, Applied Optics, vol. 36, No. 20, pp. 4853-4861, Jul. 10, 1997.

* cited by examiner

*Primary Examiner*—Alessandro Amari
(74) *Attorney, Agent, or Firm*—Oliff & Berridge, PLC

(57) ABSTRACT

A hologram recording method is disclosed in which: signal light includes a plurality of arranged reversal regions in which lightness and darkness of plural pixels of a light and dark image is reversed for an intensity distribution of the light and dark image; the signal light is Fourier-transformed; the Fourier-transformed signal light and reference light are illuminated onto an optical recording medium; and the signal light is recorded as a hologram. Also is disclosed an apparatus capable of implementing the hologram recording method, and an optical recording medium usable with the method.

14 Claims, 18 Drawing Sheets

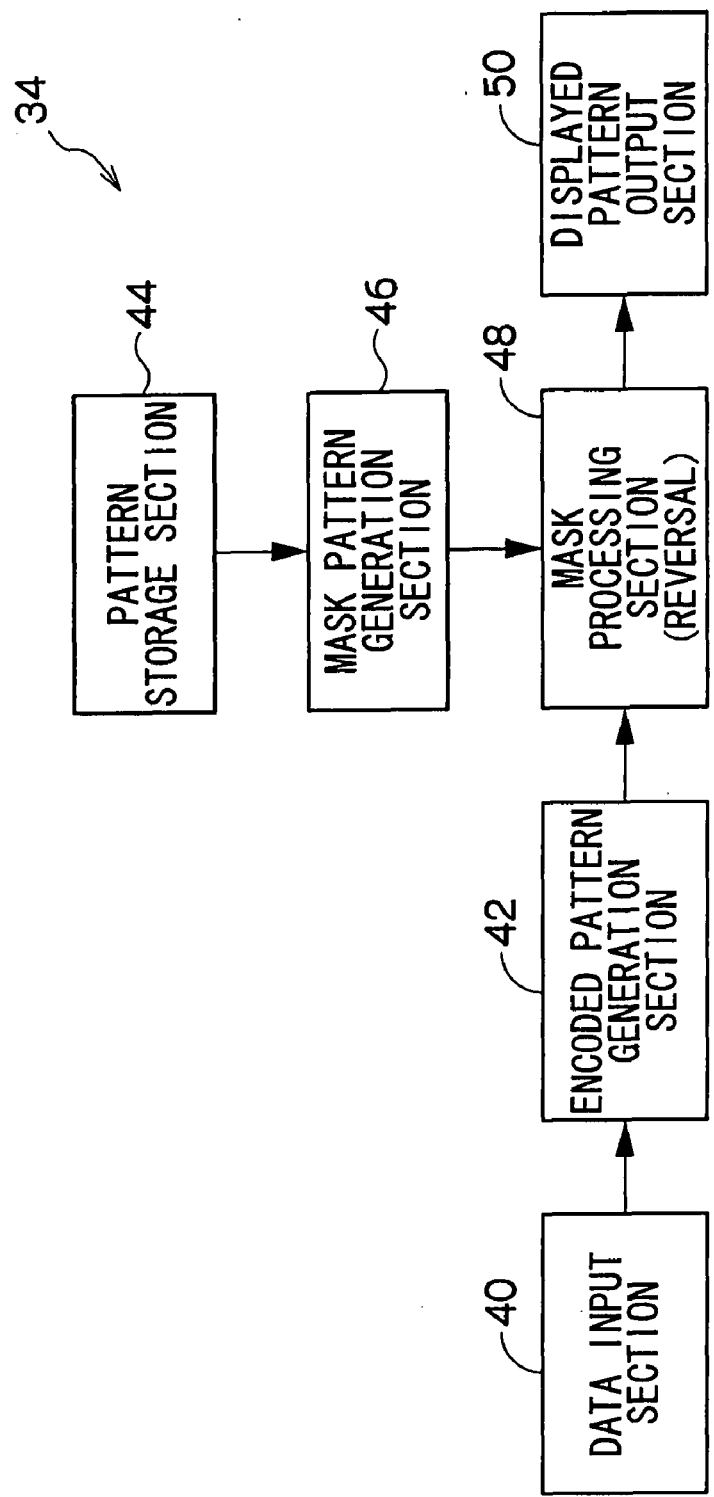

3 PIXELS / 52
3 PIXELS (UNIT)

12 PIXELS
12 PIXELS
52

(UNIT BLOCK)

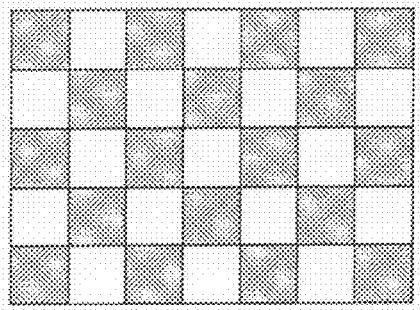
FIG.4A
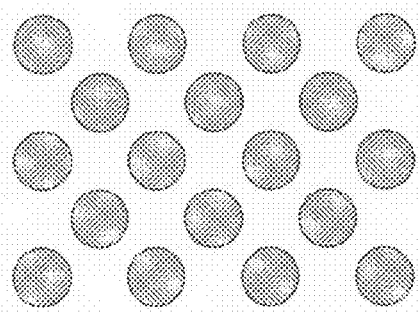
FIG.4B
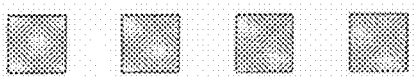
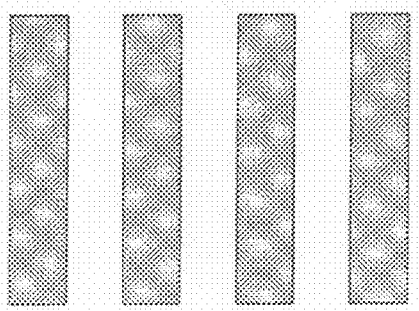
FIG.4C
FIG.4D

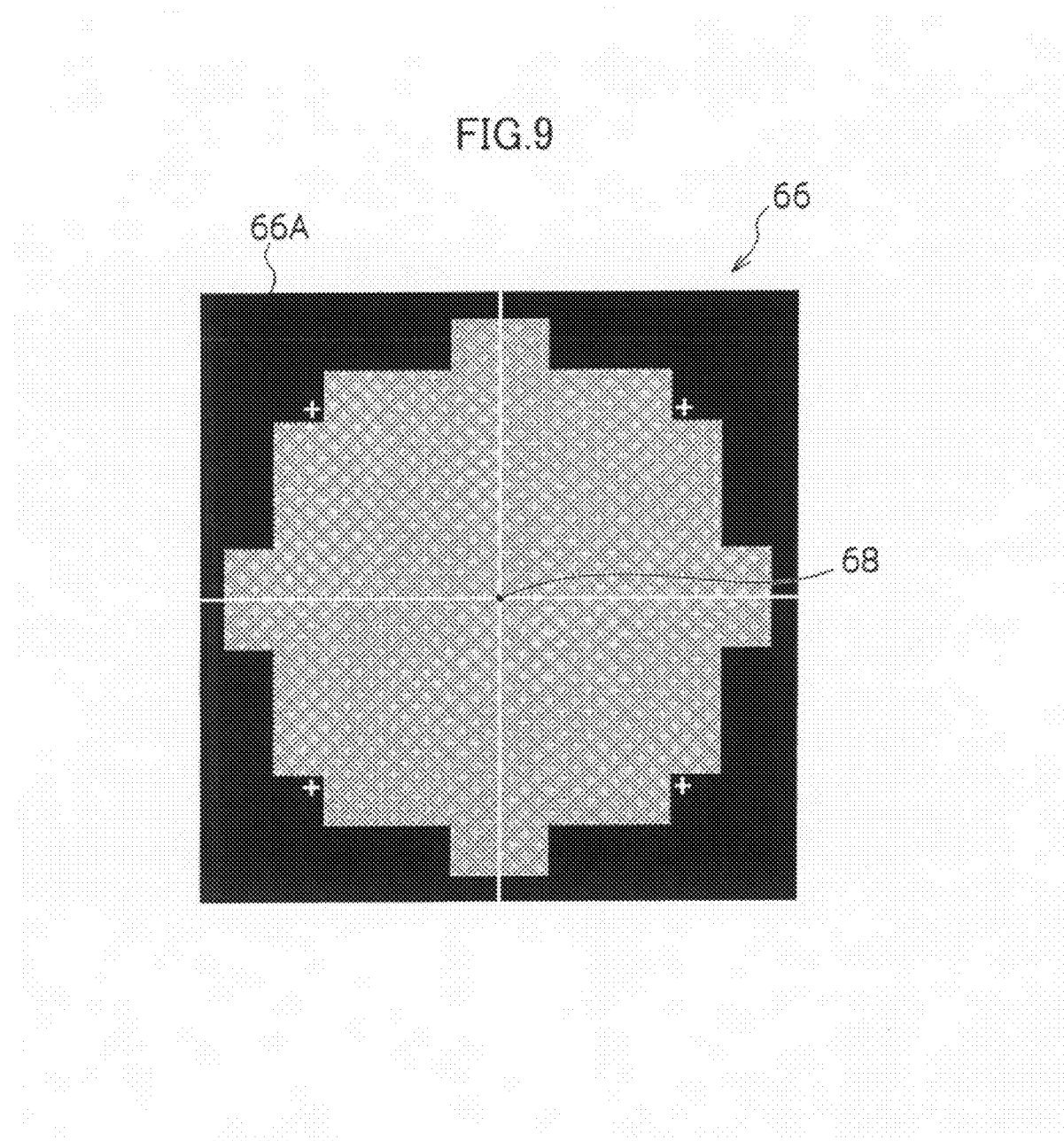

Rate 6:9 code (6 bits ⇒ 3 × 3 array)

6 bits × 64 symbols × 68 sub pages ⇒ 26112 bits ⇒ 3264 bytes

Rate 5:9 code (5 bits ⇒ 3 × 3 array)
5 bits × 64 symbols × 68 sub pages ⇒ 21760 bits ⇒ 2720 bytes
FIG.11A              FIG.11B
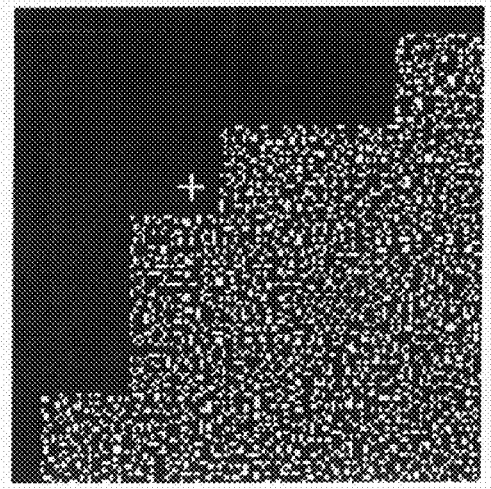 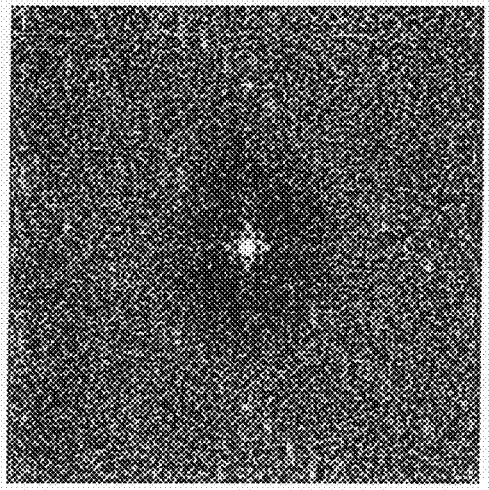
Rate 6:9 code with 12 × 12 checker pattern
6 bits × 64 symbols × 68 sub pages ⇒ 26112 bits ⇒ 3264 bytes
FIG.12A              FIG.12B
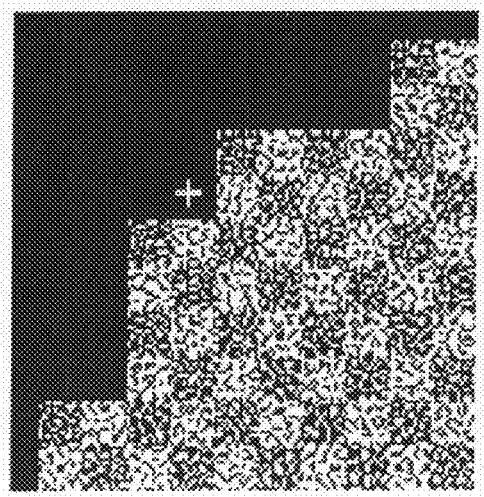 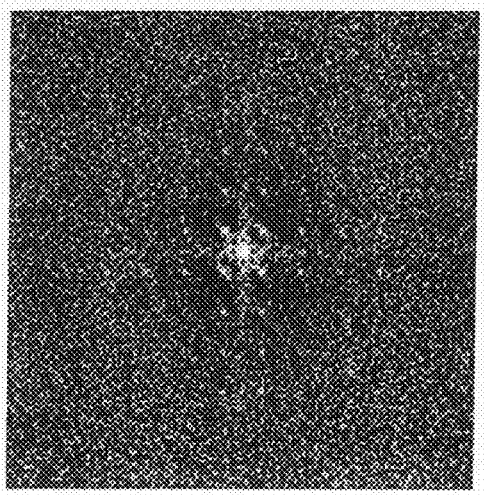

Rate 6:9 code with 6 × 6 checker pattern
6 bits × 64 symbols × 68 sub pages ⇒ 26112 bits ⇒ 3264 bytes
FIG.13A                    FIG.13B
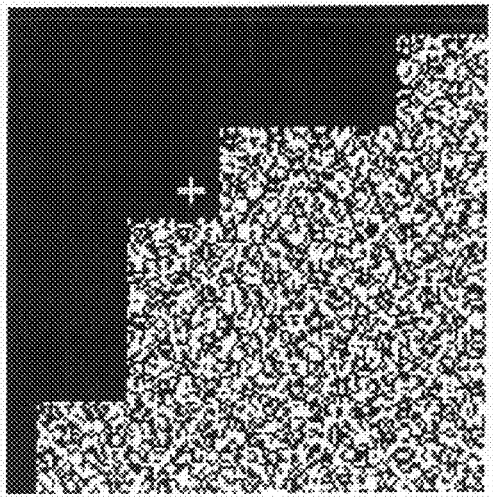
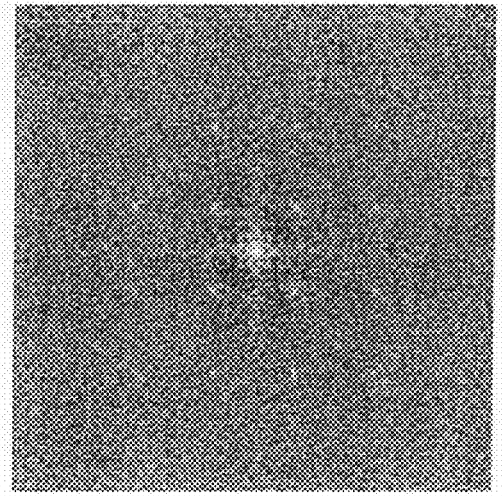
Rate 6:9 code with 3 × 3 checker pattern
6 bits × 64 symbols × 68 sub pages ⇒ 26112 bits ⇒ 3264 bytes
FIG.14A                    FIG.14B
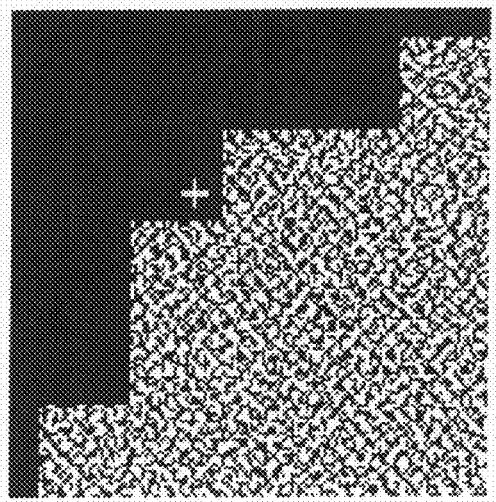
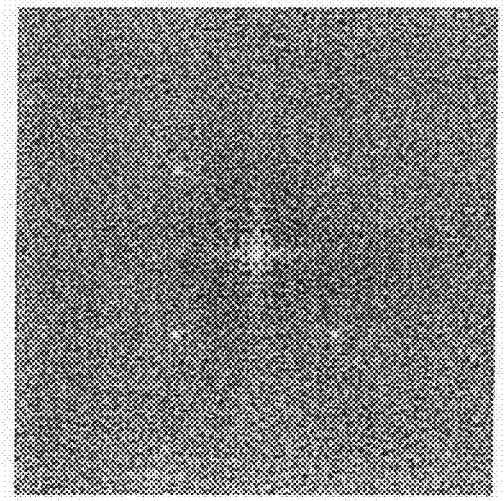

Rate 6:9 code with 12 × 12 periodic pattern

Rate 6:9 code with 6 × 6 periodic pattern

Rate 5:9 code with 6 × 6 checker pattern 02
5 bits × 64 symbols × 68 sub pages ⇒ 21760 bits ⇒ 2720 bytes
FIG.17A                    FIG.17B
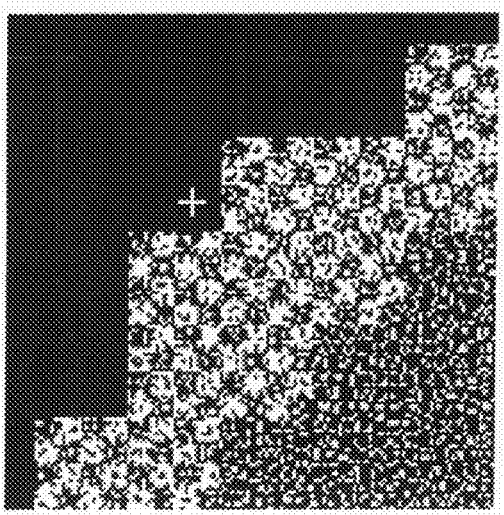 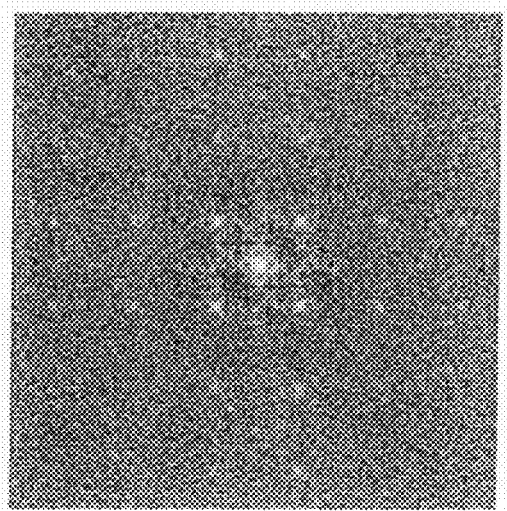
Rate 5:9 code with 3 × 3 & 6 × 6 checker patterns
5 bits × 64 symbols × 68 sub pages ⇒ 21760 bits ⇒ 2720 bytes
FIG.18A                    FIG.18B
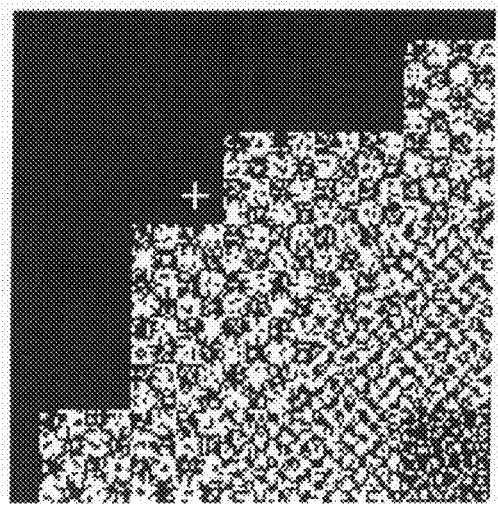 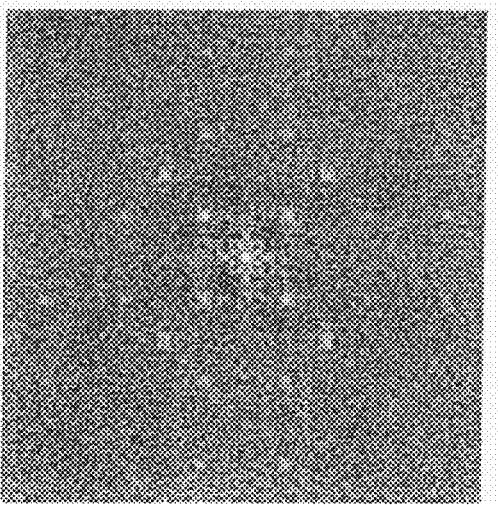

Rate 6:9 code with 3 × 3 checker pattern (Isolated pixel)

6 bits × 64 symbols × 68 subpages ⇒ 26112 bits ⇒ 3264 bytes

Rate 5:9 code with 3 × 3 & 6 × 6 checker patterns (Isolated pixel)

5 bits × 64 symbols × 68 subpages ⇒ 21760 bits ⇒ 2720 bytes

HOLOGRAM RECORDING APPARATUS, HOLOGRAM RECORDING METHOD AND OPTICAL RECORDING MEDIUM

CROSS-REFERENCE TO RELATED APPLICATION

This application claims priority under 35 USC 119 from Japanese Patent Applications Nos. 2006-214460 and 2007-011517 filed Aug. 7, 2006 and Jan. 22, 2007 respectively.

BACKGROUND OF THE INVENTION

1. Technical Field

The present invention relates to a hologram recording apparatus, a hologram recording method and an optical recording medium, and particularly relates to a hologram recording apparatus, hologram recording method and optical recording medium in which a signal that represents digital data as a light and dark image is Fourier-transformed and the Fourier transform image is recorded as a hologram.

2. Related Art

In holographic data storage, zeros and ones of binary digital data are converted to a digital image (signal light) as light pixels and dark pixels, and the signal light is Fourier-transformed by a lens and projected onto an optical recording medium. Thus, the Fourier transform image is recorded as a hologram in the optical recording medium. However, a Fourier transform image of digital data has a very strong peak intensity at zero order. Thus, in holographic data storage, a dynamic range of the optical recording medium is wasted by the zero order optical component (a not scattered component), and there is a problem in that an SNR (signal-to-noise ratio) falls.

In order to solve this problem, a method has been proposed for making a power spectrum of a Fourier transform image uniform, by utilizing a random phase mask. In this method, a random phase mask constituted by a transparent plate which is formed with minute irregularities using photolithography or the like, is used, and a random phase distribution is superimposed on the signal light intensity distribution. Thus, the zero-order component of the signal light is shifted toward the high frequency side, and the intensity distribution of the Fourier transform image to be recorded is made uniform.

However, when the random phase distribution is superimposed on the signal light, there is a problem such that complex speckle noise occurs in a reproduced image so that the SNR of reproduced data decreases. Furthermore, when the random phase distribution is superimposed on the signal light, there is another problem such that the focal depth decreases and there is tight accuracy required for positioning of a light-receiving element at the time of reproduction. A further problem is such that difficulties are encountered in fabricating random phase masks cheaply and in large volumes, and fabrication costs of recording/reproducing apparatuses are increased due to use of random phase masks.

SUMMARY

The present invention has been made in order to solve the problems described above, and provides a hologram recording apparatus and hologram recording method which can record and reproduce digital data as holograms with high SNRs. The present invention also provides an optical recording medium which can reproduce digital data with a high SNR.

An aspect of the present invention provides a hologram recording method including: Fourier-transforming signal light in which, for an intensity distribution of light representing digital data as a light and dark image, plural of reversal regions are arranged in which lightness and darkness of plural of pixels of the light and dark image is reversed; illuminating the Fourier-transformed signal light and a reference light onto an optical recording medium; and recording the signal light as a hologram.

Another aspect of the present invention provides a hologram recording apparatus including: an illumination light source that illuminates coherent light; a spatial light modulator that has a structure in which plural of pixels that transmit or reflect the coherent light illuminated from the illumination light source are arrayed and modulates the coherent light for each pixel by transmitting or reflecting the coherent light; a pattern generating unit that comprises an input section at which digital data is inputted; an encoding section that two-dimensionally encodes the inputted data to generate a light and dark pattern, a reversal-processing section that forms plural of reversal regions in which lightness and darkness of plural of pixels of the light and dark pattern are reversed for the light and dark pattern, and an output section that outputs an output signal for displaying the reversal-processed light and dark pattern at the spatial light modulator; a control unit that controls the pixels of the spatial light modulator in accordance with the output signal of the pattern generating unit so that signal light is generated by the spatial light modulator; an optical system that Fourier-transforms the signal light generated by the spatial light modulator; and an illuminating unit that illuminates the Fourier-transformed signal light and a reference light onto an optical recording medium.

A further aspect of the present invention provides an optical recording medium including, recorded as a hologram, a Fourier-transformed image of signal light including plural of arrayed reversal regions in which lightness and darkness of plural of pixels of a light and dark image is reversed for an intensity distribution of light representing digital data as the light and dark image.

Other aspects, features and advantages of the present invention will become apparent from the following description taken in conjunction with the accompanying drawings.

BRIEF DESCRIPTION OF THE DRAWINGS

Exemplary embodiments of the present invention will be described in detail based on the following figures, in which:

FIG. 2 is a block diagram showing a structure of a pattern generator;

FIGS. 4A to 4D are diagrams showing periodic patterns;

FIG. 9 is a view showing an overall image of a pattern which is displayed at a display region of a spatial light modulator;

FIG. 11A is a view showing a pattern which is displayed at a spatial light modulator;

FIG. 11B is a view showing a Fourier transform pattern calculated by a fast Fourier transform from the displayed pattern shown in FIG. 11A;

FIG. 12A is a view showing a pattern which is displayed at a spatial light modulator;

FIG. 12B is a view showing a Fourier transform pattern calculated by a fast Fourier transform from the displayed pattern shown in FIG. 12A;

FIG. 13A is a view showing a pattern which is displayed at a spatial light modulator;

FIG. 13B is a view showing a Fourier transform pattern calculated by a fast Fourier transform from the displayed pattern shown in FIG. 13A;

FIG. 14A is a view showing a pattern which is displayed at a spatial light modulator;

FIG. 14B is a view showing a Fourier transform pattern calculated by a fast Fourier transform from the displayed pattern shown in FIG. 14A;

FIG. 17A is a view showing a pattern which is displayed at a spatial light modulator;

FIG. 17B is a view showing a Fourier transform pattern calculated by a fast Fourier transform from the displayed pattern shown in FIG. 17A;

FIG. 18A is a view showing a pattern which is displayed at a spatial light modulator;

FIG. 18B is a view showing a Fourier transform pattern calculated by a fast Fourier transform from the displayed pattern shown in FIG. 18A;

DETAILED DESCRIPTION

Exemplary embodiments of the present invention will be described in detail with reference to the drawings.

—Hologram Recording/Reproducing Apparatus—

Figure 1:
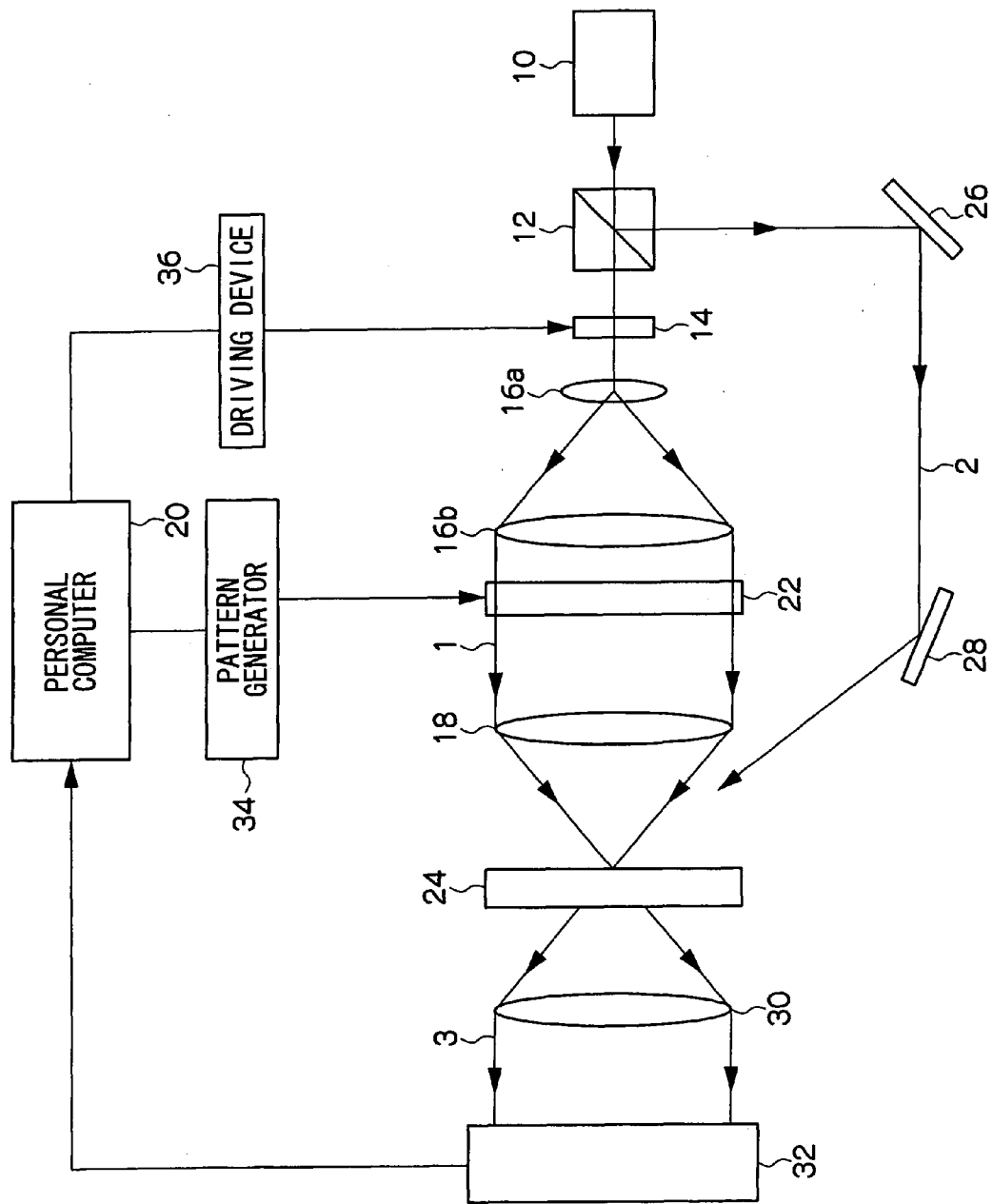
FIG. 1 is a schematic view showing a structure of a hologram recording/reproducing apparatus for use with a present exemplary embodiment.

FIG. 1 is a schematic view showing structure of a hologram recording/reproducing apparatus to be used with the present exemplary embodiment.

In this hologram recording/reproducing apparatus, there is provided a light source 10 that emits laser light, which is coherent light. A beam splitter 12 is disposed at a laser light emission side of the light source 10. The beam splitter 12 separates the laser light into a beam for signal light and a beam for reference light. At a light transmission side of the beam splitter 12, a shutter 14, which serves to block the beam for signal light transmitted through the beam splitter 12, is disposed in a manner such as to be movable into and out of a light path. At the light transmission side of the shutter 14, a lens system is disposed which is structured by collimator lenses 16a and 16b and a Fourier transform lens 18, which are located in this order.

A transmission-type spatial light modulator 22 is disposed between the collimator lens 16b and the Fourier transform lens 18. The spatial light modulator 22 is structured by a liquid crystal display device or the like, modulates the signal light laser beam in accordance with digital data supplied by a computer 20, and generates a digital pattern (signal light 1) for each page. Reflection mirrors 26 and 28 are disposed at a light reflection side of the beam splitter 12, for reflecting the reference light laser beam (reference light 2), which has been reflected at the beam splitter 12, and changing a light path thereof to a direction toward an optical recording medium 24.

At a time of hologram reproduction, when the reference light is illuminated onto the optical recording medium 24, the illuminated reference light is diffracted by a hologram, and the diffracted light is emitted from the optical recording medium 24. Thus, at a reproduced light emission side of the optical recording medium 24 are disposed a Fourier transform lens 30, and a light detector 32, which is structured with an image capture device such as a CCD, a CMOS sensor array or the like. The light detector 32 converts received reproduced light (diffracted light 3) to an electrical signal and outputs the electrical signal.

The light detector 32 is connected to the computer 20. The computer 20 is connected to the spatial light modulator 22 via a pattern generator 34 that generates a pattern to be displayed at the spatial light modulator 22. A driving device 36 is also connected to the computer 20 and which drives the shutter 14 into and out of the light path.

Next, operation of the above-described recording/reproducing apparatus will be described.

When recording a hologram, firstly, the shutter 14 is driven out of the light path by the driving device 36 in order to allow the laser beam to pass along the light path. The laser light emitted from the light source 10 is separated into the beam for signal light and the beam for reference light by the beam splitter 12. The laser beam that has been transmitted through the beam splitter 12 is collimated to a large diameter beam by the collimator lenses 16a and 16b, and is illuminated onto the spatial light modulator 22 as the beam for signal light.

Digital data is inputted to the pattern generator 34 from the computer 20. At the pattern generator 34, a pattern to be displayed at the spatial light modulator 22 is generated in accordance with supplied digital data. At the spatial light modulator 22: a composite pattern generated by the pattern generator 34 is displayed; the laser beam for signal light is intensity-modulated in accordance with the displayed pattern; and the signal light 1 is generated. Thus, the intensity distribution (hereinafter, referred to as a "digital pattern") of the signal light 1 corresponds to a light-and-dark pattern displayed at the spatial light modulator 22.

The generated signal light 1 is Fourier-transformed by the Fourier transform lens 18 and illuminated onto the optical recording medium 24. At the same time, the laser beam reflected at the beam splitter 12 is reflected by the reflection mirrors 26 and 28 and illuminated onto the optical recording medium 24 as the reference light 2. The reference light 2 is illuminated onto a region which is illuminated by the Fourier-transformed signal light 1. As a result, the Fourier-transformed signal light 1 and the reference light 2 interfere with each other in the optical recording medium 24, and the signal light 1 is recorded in the optical recording medium 24 as a hologram.

When reproducing a hologram, the shutter 14 is moved into the optical path by the driving device 36 and blocks the beam for signal light. Thus, the reference light 2 alone is illuminated onto the region of the optical recording medium 24 at which the hologram was recorded, and the illuminated reference light 2 is diffracted by the hologram. Since a Fourier transform image is recorded in the optical recording medium 24, the diffracted light 3 is reverse Fourier-transformed by the Fourier transform lens 30, and a reproduced image can be observed at a focusing plane of the Fourier transform lens 30. This reproduced image is detected by the light detector 32, and the digital data held in the signal light 1 can be read out.

—Pattern Generator—

Next, structure of the pattern generator 34 provided in the above-described recording/reproducing apparatus will be described in detail. As shown in FIG. 2, the pattern generator 34 is structured with: a data input section 40, to which digital data is inputted from the computer; an encoded pattern generation section 42 that generates an encoded pattern in accordance with the inputted data; a pattern storage section 44 that stores various patterns for forming mask patterns; a mask pattern generation section 46 that generates a mask pattern; a mask processing section 48 that carries out mask processing by referring to the mask pattern as generated; and a displayed pattern output section 50 that outputs the mask-processed pattern to the spatial light modulator 22.

Figure 3A:
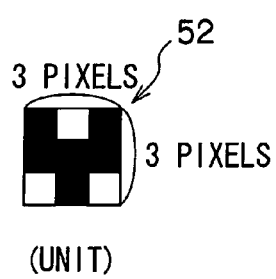
FIG. 3A is a diagram showing a unit of two-dimensional encoding.

The encoded pattern generation section 42 encodes the inputted digital data with a light and dark pattern (hereinafter, referred to as a "two-dimensional modulation code"), in which plural light/dark pixels are two-dimensionally arranged for each bit string of several bits, and generates an encoded pattern. For example, as shown in FIG. 3A, with 3×3 pixels as one unit (unit 52) and with three pixels of a total of nine pixels as "light pixels", there are $_9C_3$=84 possibilities for their combination (light and dark patterns). By using 64 (=$2^6$) light and dark patterns of them, it is possible to represent digital data of six bits.

Figure 3B:
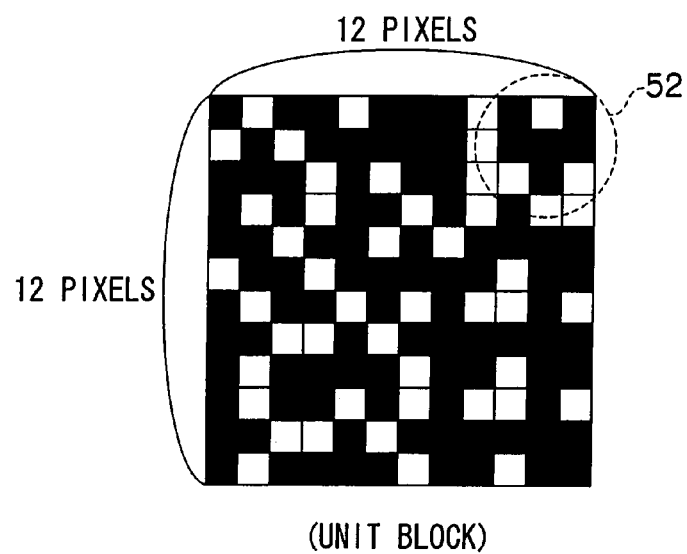
FIG. 3B is a diagram showing a unit block in which the units are arrayed in a matrix.

The digital data is encoded by a two-dimensional modulation code for each several bits, and a light and dark pattern is displayed for each unit 52. As shown in FIG. 3B, plural units 52, for which light and dark patterns are displayed, are vertically and horizontally arrayed in a predetermined sequence (a unit block 56). In this example, sixteen units are arrayed in a 4×4 matrix, and a region of 12×12 pixels is encoded. In this manner, the inputted digital data is converted to the encoded pattern.

At the pattern storage section 44, a variety of light and dark patterns constituting mask patterns are stored. The light and dark patterns include "periodic patterns", in which light portions and dark portions are periodically arranged, and "random patterns", in which light portions and dark portions are randomly arranged. As shown in FIG. 4A, a checkerboard pattern in which light portions and dark portions are arranged in a lattice pattern can be used as a periodic pattern. Further, as shown in FIG. 4B, a circle array pattern can be used in which circles (dark portions) are periodically arranged with respect to a background (light portion).

Further, as shown in FIG. 4C, a polygon array pattern can be used in which polygons (dark portions) are periodically arranged with respect to a background (light portion). Here, a case in which the polygons are squares is illustrated, but triangles, rectangles, other quadrilaterals, pentagons, hexagons, etc. are also possible. Further, as shown in FIG. 4D, a stripe pattern in which dark portions and light portions are alternately arrayed can be used. A "cycle" at which the light portions and dark portions of a periodic pattern are arrayed will be discussed later. Although examples in which patterns of dark portions are used with respect to a background (light portion) are illustrated in FIGS. 4B and 4C, it is also possible that patterns of light portions may be used with respect to a background of a dark portion.

The mask pattern generation section 46 selects one or more of periodic patterns or random patterns from the pattern storage section 44 in accordance with pre-specified conditions, and creates a mask pattern with a size the same as that of the encoded pattern. Alternatively, the mask pattern generation section 46 may divide the encoded pattern into plural regions and select different periodic patterns or random patterns for each divided region. The mask processing section 48 reverses the lightness and darkness of the encoded pattern with reference to the generated mask pattern (periodic pattern or random pattern), and creates a displayed pattern.

For example, when each dark portion is displayed as zero and each light portion is displayed as one in the encoded pattern and the mask pattern, by outputting an exclusive disjunction (XOR) of a pixel value of the encoded pattern with a pixel value of the mask pattern, it is possible to easily reverse light portions of the encoded pattern in correspondence to light portions of the mask pattern. A truth table of the XOR operation is shown below.

TABLE 1

| Input | | Output |
|---|---|---|
| Encoded pattern | Mask pattern | Displayed pattern |
| 0 | 0 | 0 |
| 0 | 1 | 1 |
| 1 | 0 | 1 |
| 1 | 1 | 0 |

Figure 5:
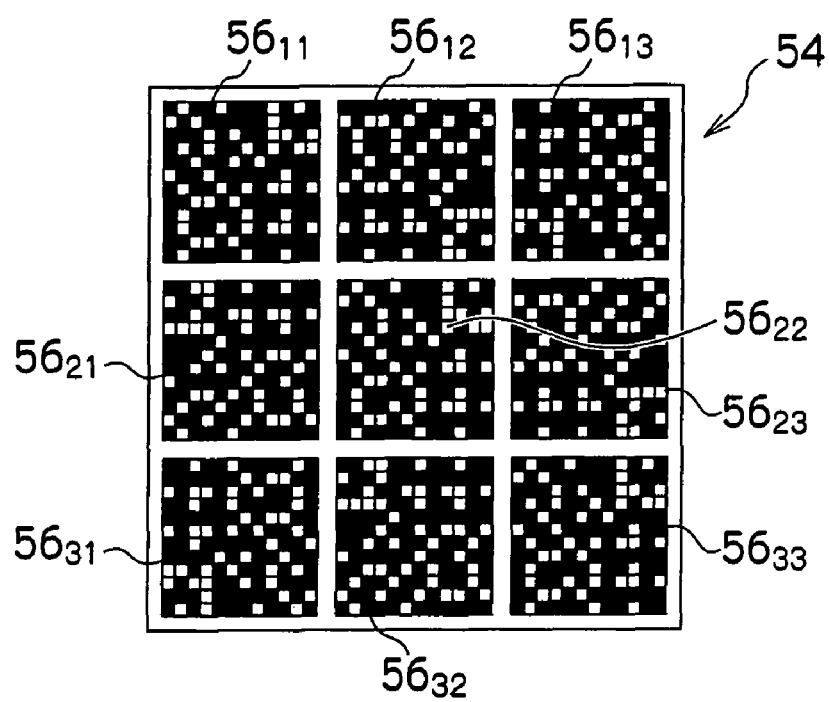
FIG. 5 is a diagram showing an example of an encoded pattern.
Figure 6:
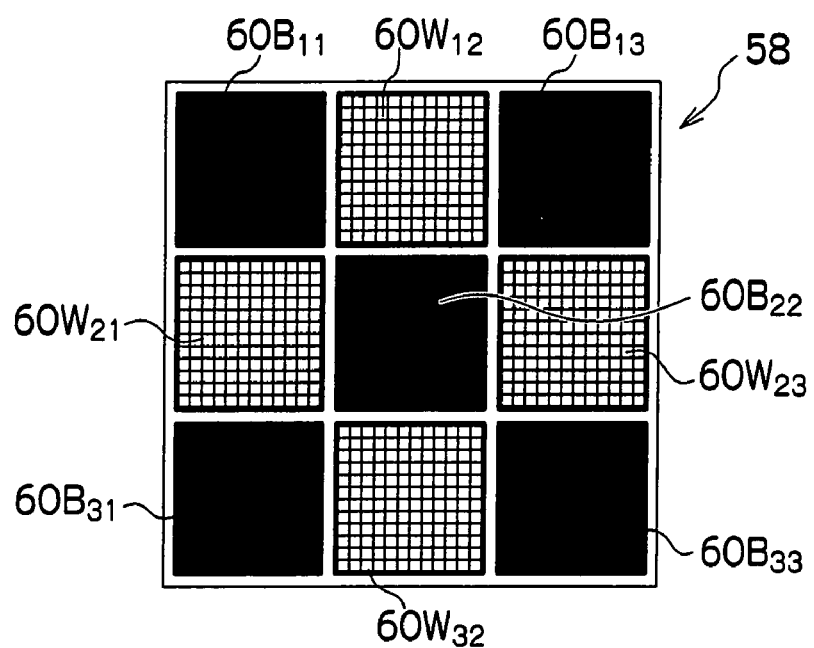
FIG. 6 is a diagram showing an example of a mask pattern.

For example, description will be given of a case in which an encoded pattern 54 shown in FIG. 5 is mask-processed using a mask pattern 58 shown in FIG. 6. In the encoded pattern 54, a region of 12×12 pixels as shown in FIG. 3B is used as unit block 56, and plural such unit blocks 56 are arrayed. In this example, nine unit blocks $56_{11}$ to $56_{33}$ are arrayed in a 3×3 matrix. The unit block $56_{mn}$ indicates a unit block disposed in row m, column n.

The mask pattern 58 is a checkerboard pattern in which light portions 60W and dark portions 60B are alternately reversed at each region of 12×12 pixels. In this example, four light portions $60W_{12}$, $60W_{21}$, $60W_{23}$ and $60W_{32}$ and five dark portions $60B_{11}$, $60B_{13}$, $60B_{22}$, $60B_{31}$ and $60B_{33}$ are arrayed in the 3×3 matrix. The light portion $60W_{mn}$ or dark portion $60B_{mn}$ indicates a portion disposed in the row m and column n of the matrix.

Figure 7:
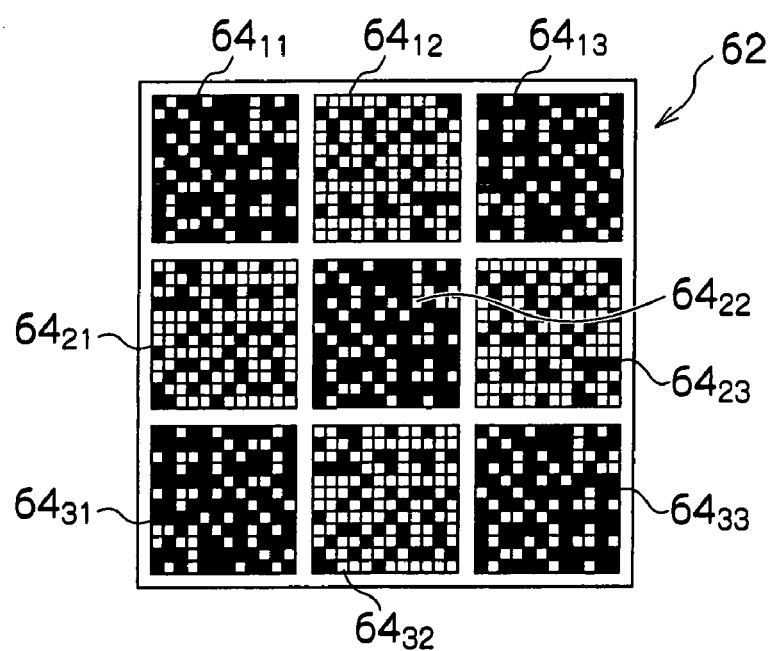
FIG. 7 is a diagram showing an example of a displayed pattern.

At the mask processing section 48, XOR calculations of pixel values of the encoded pattern 54 and pixel values of the mask pattern 58 are performed. Thus, for example, as shown in FIG. 7, the lightness and darkness of each of the pixels of the unit block 56 that correspond to the light portions 60W of the mask pattern 58 are reversed, and a displayed pattern 62 is created. In the displayed pattern 62, nine unit blocks $64_{11}$ to $64_{33}$, which correspond to the unit blocks $56_{11}$ to $56_{33}$, respectively, are arrayed in a 3×3 matrix. The unit block $64_{nm}$ indicates a unit block that is disposed in the row m and column n of the matrix.

For example, the lightness and darkness of the unit block $56_{12}$ of the encoded pattern 54 are reversed in accordance with the light portion $60W_{12}$, to form the unit block $64_{12}$ of the displayed pattern 62. Similarly, the lightness and darkness of the unit block $56_{21}$ are reversed in accordance with the light portion $60W_{21}$ to form the unit block $64_{21}$, the lightness and darkness of the unit block $56_{23}$ are reversed in accordance with the light portion $60W_{23}$ to form the unit block $64_{23}$, and the lightness and darkness of the unit block $56_{32}$ are reversed in accordance with the light portion $60W_{32}$ to form the unit block $64_{32}$. On the other hand, the lightness and darkness of the portions, which correspond to the five dark portions $60B_{11}$, $60B_{13}$, $60B_{22}$, $60B_{31}$ and $60B_{33}$, respectively, are not reversed.

By the lightness and darkness of the encoded pattern 54 being periodically reversed by reference to the mask pattern 58, a periodic pattern is superimposed on the encoded pattern 54. The displayed pattern 62 in which the periodic pattern has been superimposed is displayed at the spatial light modulator 22, and the signal light 1 is generated. The generated signal light 1 is Fourier-transformed by the Fourier transform lens 18 and illuminated onto the hologram recording medium 24. In the Fourier transform image of the signal light 1 that is generated from the displayed pattern 62, zero order light intensity is dispersed by a diffraction effect due to the reversed pattern, and the intensity distribution of the Fourier transform image is made uniform.

In FIGS. 5 and 7, adjacent unit blocks are shown as being separated in order to distinguish the individual unit blocks, but all pixels included in the encoded pattern 54 and the displayed pattern 62 would be arranged with a predetermined spacing. Furthermore, when the displayed pattern 62 is generated by carrying out XOR calculations of the pixel values of the encoded pattern 54 and the pixel values of the mask pattern 58, at a time of reproduction it is possible to return to the original encoded pattern 54 by carrying out XOR calculations of the pixel values of a the obtained reproduction pattern with the pixel values of the mask pattern 58.

—Principle of Raising SNR—

Figure 8A:
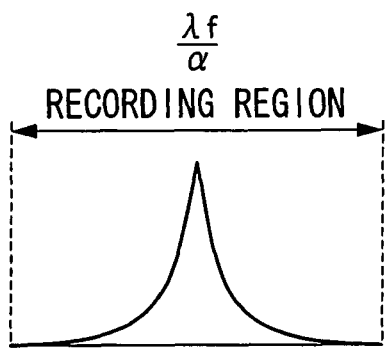
FIGS. 8A to 8C are graphs for explaining a principle of raising the SNR.
Figure 8B:
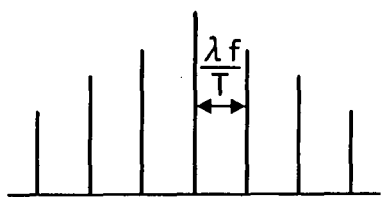
Figure 8C:
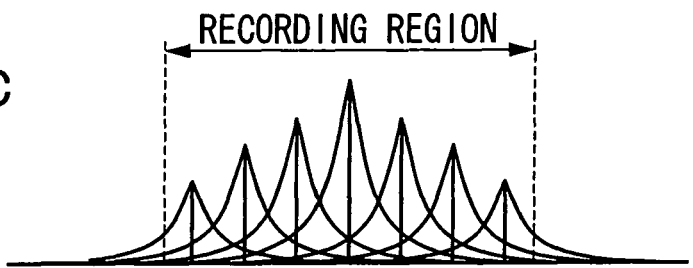

Now, the principle of raising the SNR will be described in further detail with reference to FIGS. 8A, 8B and 8C. A Fourier transform image of a digital pattern (signal light) has a very strong peak intensity at the zero order. Consequently, as shown in FIG. 8A, a Fourier transform spectrum of a recording region of a hologram is substantially a single peak, and the intensity distribution thereof is sharp. In contrast, a periodic pattern has a discrete intensity distribution corresponding to the periodic structure of the pattern, as shown in FIG. 8B, and an envelope thereof is a function of an open area ratio of the periodic pattern. With a random pattern, the intensity distribution is even more dispersed.

A mask pattern (a periodic pattern in which mask portions are periodically arrayed or a random pattern in which mask portions are randomly arrayed) is superimposed on the digital pattern by reversing the lightness and darkness of the digital pattern in accordance with the mask pattern. As shown in FIG. 8C, a Fourier transform spectrum of the digital pattern onto which the mask pattern has been superimposed appears as a convolution integration of the Fourier transform spectrum of the digital pattern with the Fourier transform spectrum of the mask pattern, and intensity peaks are dispersed. Accordingly, the intensity distribution of the Fourier transform image to be recorded can be made uniform by superimposing the mask pattern on the digital pattern.

As the above-mentioned mask pattern, a periodic pattern or random pattern featuring a frequency component lower than a maximum frequency of the digital pattern is used. For reproduction of the digital pattern, the length of one side of a minimum required recording region (a side in a case in which the recording region is substantially square) is displayed by $\lambda f/d$, with the length of one side of a pixel constituting the digital pattern being d, a recording wavelength being $\lambda$ and the focusing distance of the Fourier transform lens being f. Meanwhile, if a pattern period is T, the spacing of the dispersed intensity peaks of the periodic pattern is displayed by $\lambda f/T$.

For example, in a case of generating the digital pattern with a spatial light modulator, the length of one side of a display pixel of the spatial light modulator is d. Further, as shown in FIG. 4C, in the periodic pattern in which square portions (dark portions) serve as mask portions and are periodically arrayed, a distance between center points of two squares, which neighbor one another, is the pattern period T.

In order to form plural intensity peaks in the minimum required recording region (hereinafter, referred to as "Nyquist region"), a periodic pattern frequency $1/T$ must be lower than a maximum frequency $\frac{1}{2}d$ of the digital pattern, that is to say, the pattern period T must satisfy the condition $T>2d$. When the pattern period T satisfies the condition $T>2d$, a Fourier transform image featuring plural intensity peaks can be formed in the Nyquist region, and a high SNR can be achieved even if the recording region is very small.

As described above, in the present exemplary embodiment, a mask pattern (a periodic pattern in which mask portions are periodically arrayed or a random pattern in which mask portions are randomly arrayed) is superimposed on an encoded pattern, signal light is generated from a digital pattern in which the mask pattern has been superimposed, and the signal light is Fourier-transformed. Thus, the zero order light intensity is dispersed in the Fourier transform image, the intensity distribution of the Fourier transform image is made uniform, and the digital data can be recorded and reproduced with a high SNR.

In the conventional hologram recording process, because the Fourier transform image of a digital pattern (signal light) features a very strong peak intensity at the zero order, a Fourier transform spectrum in a hologram recording region is substantially a single peak, and the intensity distribution is very steep. Consequently, in order to record a hologram, it is required that a reference light intensity match the high peak intensity, and it is generally necessary for the light intensity of the reference light to be set ten or more times higher than an average light intensity of the signal light.

In the present exemplary embodiment, since the intensity distribution of the Fourier transform image is made uniform, it is possible to reduce the light intensity of the reference light to about one tenth of the conventional value. Accordingly, since the exposure energy required for recording can be greatly decreased, the dynamic range of an optical recording medium can be effectively utilized, and recording/reproduction with a high SNR (signal-to-noise ratio) is enabled.

Moreover, as compared with a case in which a random phase distribution is superimposed on signal light, complex speckle noise is not generated, and thus alignment of a reproducing optical system is easier. In addition, since no expensive random phase mask is used, equipment cost can be reduced. Thus, the hologram recording method of the present invention has general applicability with low cost.

Further, in the exemplary embodiment described above, since an encoded pattern obtained by encoding digital data is reversed periodically and recorded, when the hologram is reproduced, a reproduction pattern of which a digital pattern has been partially reversed is obtained. Coordination of lightness and darkness of the reproduction pattern with pixels (data positions) is performed, binarization processing is performed, and then XOR calculations between pixel values of the obtained reproduction pattern and pixel values of the mask pattern are performed. Thus, the original encoded pattern can be reproduced, and the original digital data can be decoded from the reproduced encoded pattern.

Further, in the exemplary embodiment described above, an example has been described in which the signal light and the reference light are illuminated onto the optical recording medium from different directions to record a hologram, but the present invention can also be applied to a case of "coaxial recording", in which the signal light and reference light are Fourier-transformed by the same lens and illuminated onto the optical recording medium.

Furthermore, in the exemplary embodiment described above, an example has been described in which a mask pattern is generated from a pre-memorized periodic pattern or random pattern and a displayed pattern is generated in accordance with this mask pattern. However, as long as control can be performed such that an encoded pattern is reversed in accordance with a mask pattern, there is no particular limitation, and the method for generating a displayed pattern is not limited to that described above. As another method, for generating a displayed pattern, the following method is available.

When digital data is to be converted to two-dimensional modulation codes, a lookup table is generally used which associates bit rows with two-dimensional modulation codes. In the present inventive method, an inversion lookup table is also prepared. It is determined whether or not an inputted bit row (unit) is to be reversed on the basis of a sequence number thereof (i.e., information on a position thereof in the encoded pattern), and if inversion is to be performed, the coding is performed using the inversion lookup table. Thus, the encoded pattern can be reversed in accordance with a mask pattern.

Then, when decoding, for a reproduced unit pattern (two-dimensional modulation codes), it is judged which of the tables to employ in accordance with positional information of a unit pattern, pattern matching is carried out, and the unit pattern is converted to a bit row using the corresponding lookup table. In a case of this method, the unit 52 shown in FIG. 3 is a minimum reversible unit. A reversal period is that of the unit or a unit block formed of plural units. Thus, it is possible to efficiently generate a displayed pattern.

EXAMPLES

Examples of the present invention will be described more specifically hereinbelow, and it is to be understood that that present invention is by no means limited thereto.

—Encoded Pattern—

Encoded patterns are structured using three kinds of two-dimensional modulation codes, which are illustrated below.

(1) 6:9 Code

In a case where a 3×3 pixel of a spatial light modulator forms a single unit and three pixels of the total of nine pixels are "light pixels", there are $_9C_3$=84 possibilities for their combination (light and dark pattern). Of these, 64 (=$2^6$) light and dark patterns are used, and digital data of six bits are displayed. Such a two-dimensional modulation code is referred to as a "6:9 code".

(2) 5:9 Code

In a case where a 3×3 pixel of a spatial light modulator forms a single unit and two pixels of the total of nine pixels are "light pixels", there are $_9C_2$=36 possibilities for their combination (light and dark pattern). Of these, 32 (=$2^5$) light and dark patterns are used, and digital data of five bits are displayed. Such a two-dimensional modulation code is referred to as a "5:9 code".

(3) Isolated Code

A pattern in which one pixel of the above-mentioned 6:9 code or 5:9 code or the like is structured by 2×2 pixels of the spatial light modulator, and a particular pixel of the 2×2 pixels is a light portion, is referred to as an "isolated code". If a degree of recording multiplexing is increased, there will be cases in which high frequency components which are recorded with relatively weak light degrade, such as when "dark" pixels surrounded by a "light" region collapse or the like, but when the "light" pixels are isolated thus, it is possible to carry out recording/reproduction with high SNR. Also, when using a spatial light modulator with a small open area ratio or using an intensity mask such that the open area ratio corresponding to a pixel is lowered, similar effects can be obtained.

—FFT Simulation—

A displayed pattern is structured using a two-dimensional modulation code described above, and a Fourier transform pattern is calculated for various conditions by Fourier transform software (fast Fourier transform (FFT)).

Comparative Example 1

Figure 10A:
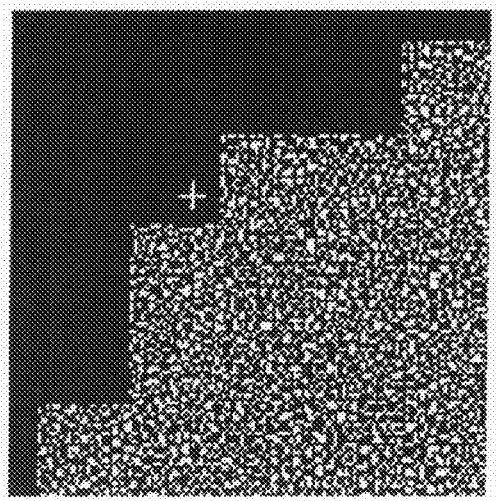
FIG. 10A is a view showing a pattern which is displayed at the spatial light modulator.

Digital data encoded with the 6:9 code (an encoded pattern) is displayed at the display region of a spatial light modulator. In this example, 68 sub pages are used in which 64 (8×8) 6-bit units are arrayed, and digital data of 26,112 bits (=3,264 bytes) are encoded. The displayed pattern is illustrated in FIG. 9. As shown in FIG. 9, at the display region 66 of the spatial light modulator, the encoded pattern is displayed at a circular region centering on an optical axis 68, and generates the signal light. The display region 66 is divided into quarters, and only one quarter region 66A is shown in FIG. 10A. Hereinbelow, only the quarter-regions are shown as displayed patterns, but in FFT simulations, the Fourier transform patterns are calculated from patterns displayed over the entire display region. Note that the "+" marks in the illustrations are marks for positioning.

Figure 10B:
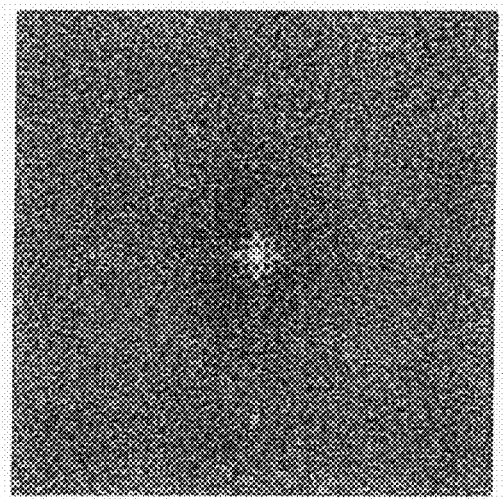
FIG. 10B is a view showing a Fourier transform pattern calculated by a fast Fourier transform from the displayed pattern shown in FIG. 10A.

A Fourier transform pattern which is calculated by FFT from the displayed pattern shown in FIG. 10A is shown in FIG. 10B. As can be seen from FIG. 10B, the Fourier transform pattern features spreading in accordance with the frequency distribution of the encoded pattern, but includes a very strong peak intensity at the zero order (non-scattered component). Consequently, it is understood that degradation of the SNR of reproduced data may be caused due to the dynamic range of the recording material being insufficient.

Comparative Example 2

Digital data encoded with the 5:9 code (an encoded pattern) is displayed at an display region of a spatial light modulator. In this example, 68 sub pages are used in which 64 (8×8) 5-bit units are arrayed, and digital data of 21,760 bits (=2,720 bytes) are encoded. The displayed pattern is shown in FIG. 11A. The Fourier transform pattern calculated by FFT from the displayed pattern shown in FIG. 11A is shown in FIG. 11B. As in Comparative Example 1, a strong non-scattered component is present in the Fourier transform pattern, and thus it is clear that degradation of the SNR of reproduced data will be caused.

Example 1

A checkerboard pattern with a size the same as that of the encoded pattern and whose lightness and darkness is reversed for each set of 12×12 pixels (4×4 units), is used as a periodic pattern. Referring to the periodic pattern, the lightness and darkness of pixels of the encoded pattern, which correspond to dark portions of the periodic pattern and are encoded with the 6:9 code, are reversed to generate a displayed pattern. The pattern thus generated is displayed at the display region of a spatial light modulator.

The displayed pattern is shown in FIG. 12A. The Fourier transform pattern calculated by FFT from the displayed pattern shown in FIG. 12A is shown in FIG. 12B. From FIG. 12B, it is seen that intensity peaks corresponding to the reversal period appear in the Fourier transform pattern, and the zero-order intensity is dispersed.

Similarly, in a case where a checkerboard pattern whose lightness and darkness is reversed for each set of 6×6 pixels (2×2 units) is used as a periodic pattern, a displayed pattern shown in FIG. 13A and a Fourier transform pattern shown in FIG. 13B are obtained. Further, in a case where a checkerboard pattern whose lightness and darkness is reversed for each set of 3×3 pixels (single unit) is used as a periodic pattern, a displayed pattern such as shown in FIG. 14A and a Fourier transform pattern such as shown in FIG. 14B are obtained.

As can be seen from FIGS. 12A to 14B, the peaks due to the periodic pattern appear further to outer sides when the period T is shorter. When the pattern period T satisfies the condition T>2d, a Fourier transform image featuring plural intensity peaks within the Nyquist region may be formed, and it is possible to realize high SNR even if the recording region is made very small.

Example 2

A pattern with a size the same as the encoded pattern, in which dark portions of 12×12 pixels (4×4 units) are arranged with a period corresponding to 24 pixels on a background which is a light portion, is used as a periodic pattern. Referring to this periodic pattern, the lightness and darkness of each pixel of the encoded pattern, which is encoded with the "6:9 code" in correspondence to the dark portions of the periodic pattern, is reversed so as to generate a displayed pattern. The generated pattern is displayed at the display region of a spatial light modulator.

Figure 15A:
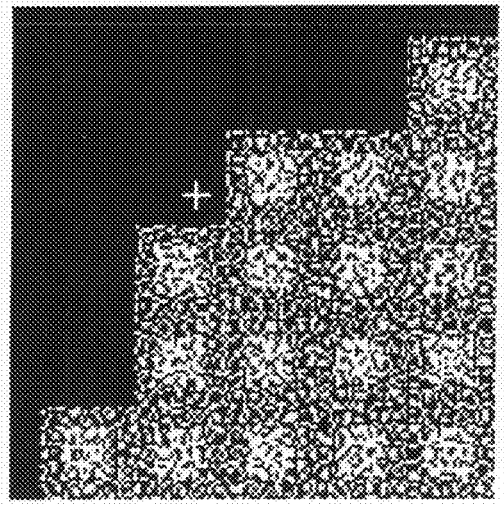
FIG. 15A is a view showing a pattern which is displayed at a spatial light modulator.
Figure 15B:
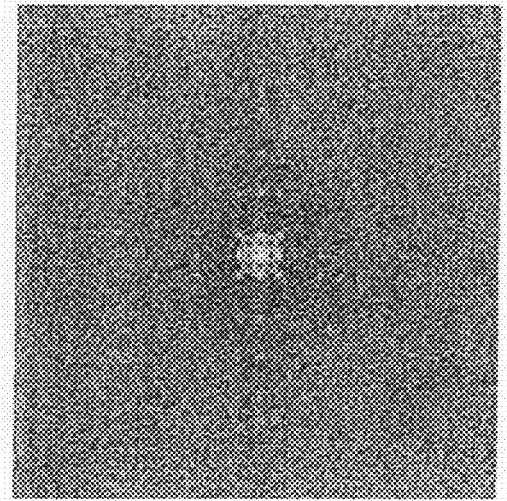
FIG. 15B is a view showing a Fourier transform pattern calculated by a fast Fourier transform from the displayed pattern shown in FIG. 15A.

The displayed pattern is shown in FIG. 15A. A Fourier transform pattern calculated by FFT from the displayed pattern shown in FIG. 15A is shown in FIG. 15B. From FIG. 15B, it is seen that, as in Example 1, sub-peaks due to the periodic pattern appear in the Fourier transform pattern, and the zero-order intensity is dispersed.

Figure 16A:
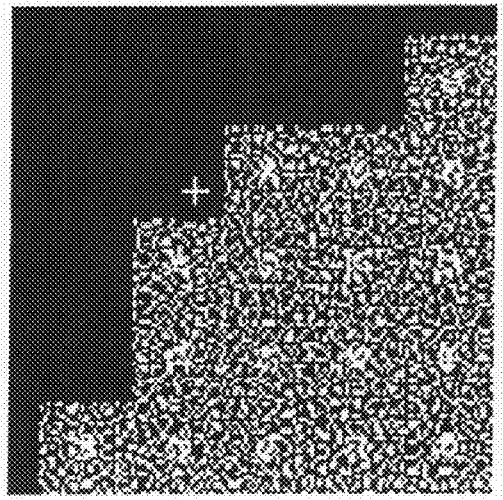
FIG. 16A is a view showing a pattern which is displayed at a spatial light modulator.
Figure 16B:
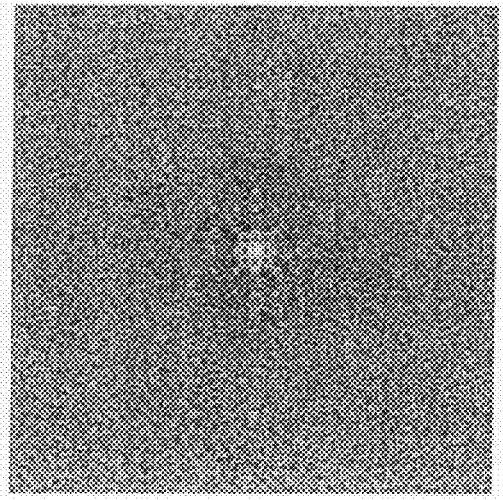
FIG. 16B is a view showing a Fourier transform pattern calculated by a fast Fourier transform from the displayed pattern shown in FIG. 16A.

Likewise, in a case where a pattern in which dark portions of 6×6 pixels (2×2 units) are arranged with a period corresponding to 24 pixels is used as a periodic pattern, a displayed pattern such as shown in FIG. 16A and a Fourier transform pattern such as shown in FIG. 16B are obtained. As can be seen from a comparison of FIGS. 15B and 16B, the position and number of the sub peaks can be changed in accordance with the size of the light portions used in the periodic pattern.

Example 3

A pattern in which a checkerboard pattern whose lightness and darkness is reversed for each set of 6×6 pixels (2×2 units), is arranged in a concentric form about an optical axis is used as a periodic pattern. This periodic pattern is disposed only at peripheral edge portions of the encoded pattern shown in FIG. 9. Referring to this periodic pattern, the lightness and darkness of pixels of the encoded pattern encoded with the 5:9 code in correspondence to the dark portions of the periodic pattern is reversed to generate a displayed pattern. The generated pattern is displayed at the display region of a spatial light modulator.

The displayed pattern is shown in FIG. 17A. A Fourier transform pattern calculated by FFT from the displayed pattern shown in FIG. 17A is shown in FIG. 17B. From a comparison with FIG. 13B of Example 1, it is seen that sub peaks caused due to the periodicity of the sets of 6×6 pixels (2×2 units) are generated, and that because of diffraction due to the periodic pattern being arranged in the concentric form, spots of the intensity peaks are larger (have spread). That is, it is seen that since the checkerboard pattern is arranged periodically (substantially concentrically in this example), a periodicity different from that of the checkerboard pattern is provided so that the intensity distribution is made more uniform.

Example 4

A pattern in which two types of checkerboard pattern are arranged in concentric forms about optical axes is used as a periodic pattern. In this periodic pattern, the checkerboard pattern whose lightness and darkness is reversed for each set of 6×6 pixels (2×2 units) is arranged at the peripheral edge portion of the encoded pattern, and the checkerboard pattern whose lightness and darkness is reversed for each set of 3×3 pixels (single unit) is arranged at the inner side thereof. No checkerboard pattern is arranged around the optical axis. Referring to this periodic pattern, the lightness and darkness of the pixels of the encoded pattern encoded with the "5:9 code" in correspondence to the dark portions of the periodic pattern is reversed to generate a displayed pattern. The generated pattern is displayed at the display region of a spatial light modulator.

The displayed pattern is shown in FIG. 18A. A Fourier transform pattern calculated by FFT from the displayed pattern shown in FIG. 18A is shown in FIG. 18B. From FIG. 18B, it is seen that, as in Example 3, the intensity peaks of the Fourier transform pattern are broadened due to diffraction caused by the periodic patterns arranged in the concentric forms. Furthermore, from a comparison with FIG. 17B of Example 3, it is seen that by mixing the plural periodicities present in the periodic patterns, the number of intensity peaks in the Fourier transform pattern is further increased, and the intensity distribution is made still more uniform.

Example 5

Figure 19A:
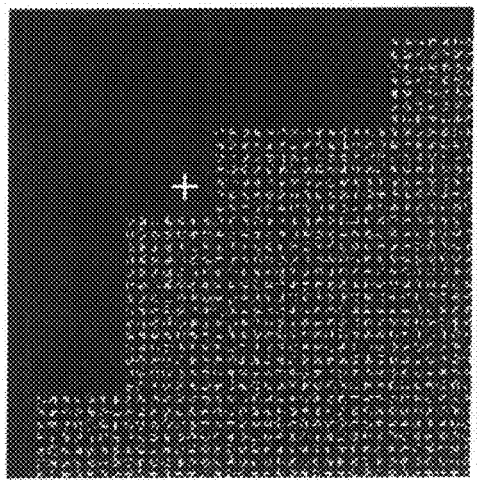
FIG. 19A is a view showing a pattern which is displayed at a spatial light modulator.
Figure 19B:
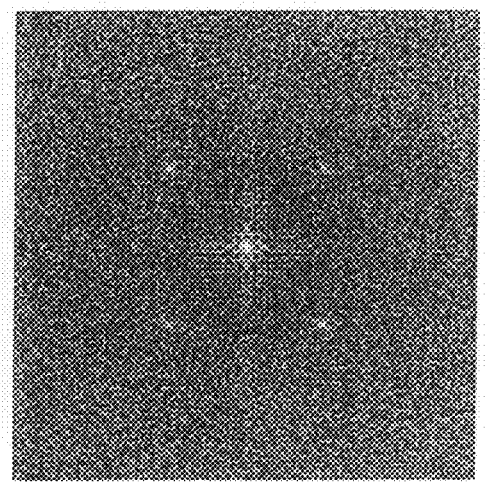
FIG. 19B is a view showing a Fourier transform pattern calculated by a fast Fourier transform from the displayed pattern shown in FIG. 19A.

A displayed pattern the same as that in Example 1 (FIG. 14) is represented with the "isolated code". The displayed pattern in this case is shown in FIG. 19A. A Fourier transform pattern calculated by FFT from the displayed pattern shown in FIG. 19A is shown in FIG. 19B. From FIG. 19B, it can be seen that also in a case where the displayed pattern is represented with the "isolated code" in which the fundamental pixels are isolated from neighboring pixels, intensity peaks corresponding to the reversal period appear in the Fourier transform pattern so that the zero-order light intensity is dispersed. Furthermore, the white ratio of the displayed pattern can be lowered because of the displayed pattern being represented with the "isolated code" so that the zero-order light intensity of the Fourier transform pattern per se can be lowered.

Figure 20A:
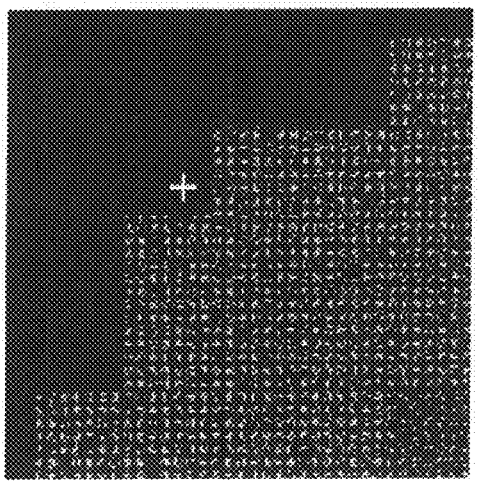
FIG. 20A is a view showing a pattern which is displayed at a spatial light modulator.
Figure 20B:
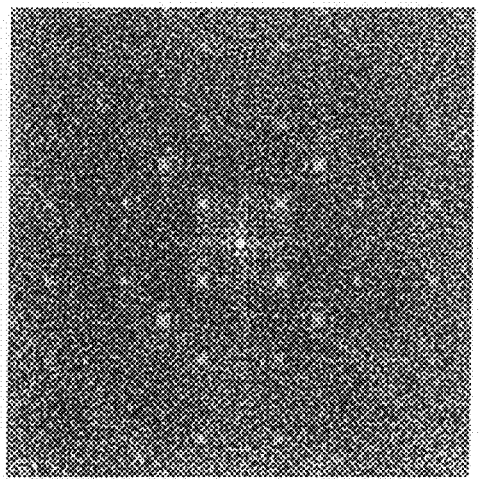
FIG. 20B is a view showing a Fourier transform pattern calculated by a fast Fourier transform from the displayed pattern shown in FIG. 20A.

Likewise, a displayed pattern the same as that in Example 4 (FIGS. 18A and 18B) is represented with the "isolated code". The displayed pattern in this case is shown in FIG. 20A. A Fourier transform pattern calculated by FFT from the displayed pattern shown in FIG. 20A is shown in FIG. 20B. From FIG. 20B, it can be seen that the zero-order intensity peak is dispersed. Moreover, the zero-order light intensity per se can be lowered.

Comparative Example 3

Figure 21A:
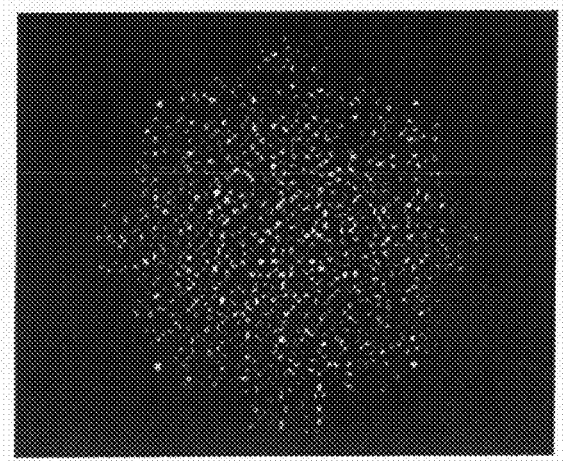
FIG. 21A is a view showing an encoding pattern which is displayed at a spatial light modulator.

Calculations are carried out using FFT. Each pixel of the 5:9 code is structured by 2×2 pixels of the spatial light modulator, and the "isolated code" is used for a pattern in which only a particular single pixel of the 2×2 pixels serves as a light portion. In this example, digital data of 21,760 bits (=2,720 bytes) is encoded using 68 sub pages in which 64 (8×8) 5-bit units are arrayed. The displayed pattern (i.e., intensity distribution) is shown in FIG. 21A. As in FIG. 9, at the display region of the spatial light modulator, the encoded pattern is displayed in a substantially circular region centering on the optical axis, and generates the signal light. The "+" marks in the illustrations are marks for positioning.

Figure 21B:
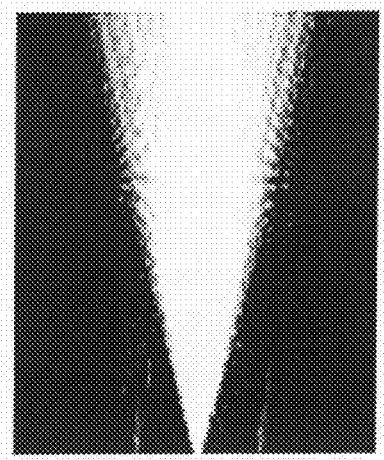
FIG. 21B is a view showing a state of propagation of the pattern light shown in FIG. 21A.
Figure 21C:
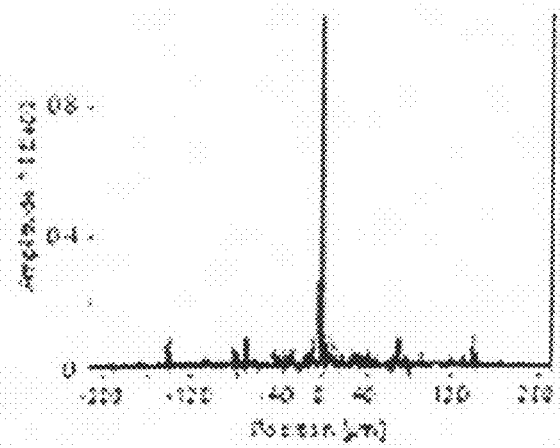
FIG. 21C is a graph showing an intensity distribution at the Fourier transform plane.

Signal light of a pattern such as shown in FIG. 21A is Fourier-transformed by a lens and focused in the Fourier transform plane. Here, a lens with a focal length of 10 mm is used. A state in which the signal light, which has passed through the lens, propagates to the focal point is shown in FIG. 21B. FIG. 21C is an intensity distribution in the Fourier transform plane. The horizontal axis shows positions orthogonal to the optical axis at the focal plane, and the vertical axis shows light intensities (i.e., a Fourier spectrum). It can be seen that, at the focal point, there is a strong non-scattered component near the optical axis, and therearound there are high-frequency components which depend on the digital data (the encoded pattern). Thus, because there is a strong non-scattered component at the zero order, it is clear that degradation of the SNR of reproduced data will result from insufficient dynamic range of a recording material.

Example 6

Figure 22A:
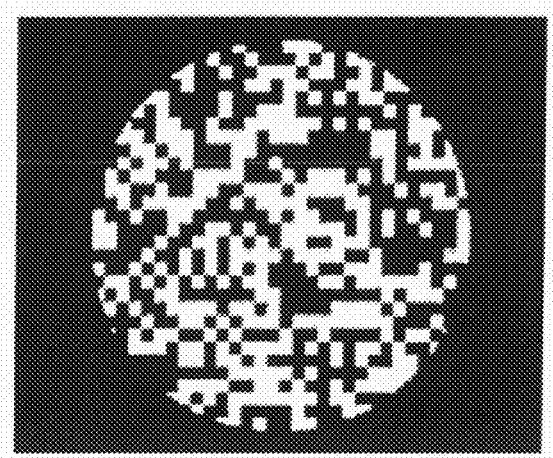
FIG. 22A is a view showing a mask pattern which is displayed at a spatial light modulator.
Figure 22B:
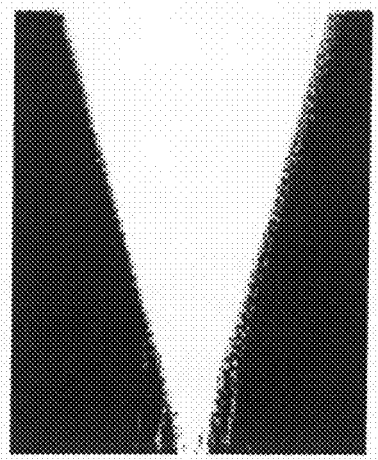
FIG. 22B is a view showing a state of propagation of the pattern light shown in FIG. 22A.
Figure 22C:
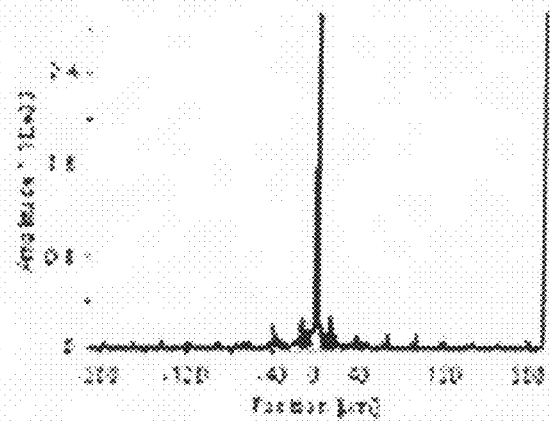
FIG. 22C is a graph showing an intensity distribution at the Fourier transform plane.

A random pattern with a size the same as the encoded pattern of Comparative Example 3 and whose lightness and darkness is reversed for each set of 8×8 pixels is used as a mask pattern. This random pattern is shown in FIG. 22A. Like the signal light, the pattern light shown in FIG. 22A is Fourier-transformed by a lens and focused in the Fourier transform plane. In FIG. 22B, there is shown a state in which the pattern light, which has passed through the lens, propagates to the focal point. From a comparison with the case of the encoded pattern shown in FIG. 21A, it is seen that in the case of the mask pattern shown in FIG. 22A, dispersion occurs in the vicinity of the low-frequency of the Fourier spectrum. This is due to the fact that large unit blocks constituted by 8×8 pixels are randomly arranged.

Referring to the mask pattern shown in FIG. 22A, the lightness and darkness of pixels of the encoded pattern is reversed in correspondence to dark portions of the random pattern to generate a displayed pattern. The generated pattern is displayed at the display region of the spatial light modulator. With dark portions of the encoded pattern and the mask pattern being respectively displayed as zeros and light portions being respectively displayed as ones, exclusive-OR (XORs) of pixel values of the encoded pattern with pixel values of the mask pattern are outputted, and thus light portions of the encoded pattern that correspond to light portions of the mask pattern are reversed. The displayed pattern is shown in FIG. 23A.

Figure 23A:
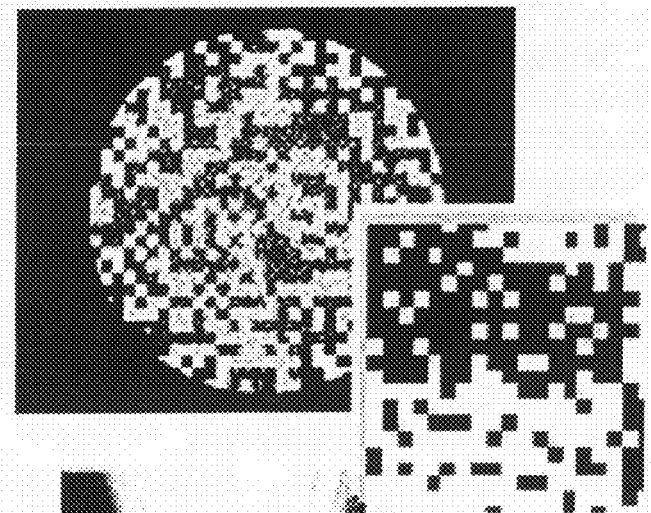
FIG. 23A is a view showing a superimposed pattern which is displayed at a spatial light modulator.
Figure 23B:
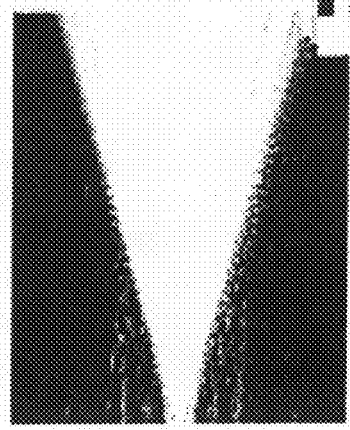
FIG. 23B is a view showing a state of propagation of the pattern light shown in FIG. 23A.
Figure 23C:
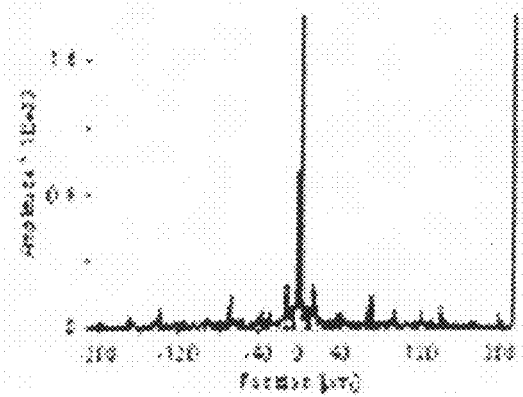
FIG. 23C is a graph showing an intensity distribution at the Fourier transform plane.

Like the signal light, the pattern light shown in FIG. 23A is Fourier-transformed by a lens and focused in the Fourier transform plane. A state in which the pattern light, which has passed through the lens, propagates to the focal point is shown in FIG. 23B. From a comparison with the case of the encoded pattern shown in FIG. 21A, it is seen that in the case of a superimposed pattern shown in FIG. 23A, because the mask pattern is used, the non-scattered component is dispersed and suppressed, while high-frequency components, which are data components, are made uniform.

What is claimed is:

1. A hologram recording method comprising:
    receiving digital data as a light and dark image having a plurality of pixels;
    Fourier-transforming signal light with an intensity distribution that represents the digital data, the intensity distribution of the signal light having a plurality of reversal regions in which lightness and darkness of the plurality of pixels of the light and dark image is reversed, and a plurality of non-reversal regions in which lightness and darkness of the plurality of pixels of the light and dark image is not reversed;
    illuminating the Fourier-transformed signal light and a reference light onto an optical recording medium; and
    recording the signal light as a hologram.

2. The hologram recording method of claim 1, wherein the signal light comprises signal light in which the reversal regions are periodically arrayed.

3. The hologram recording method of claim 1, wherein the signal light comprises signal light in which the reversal regions are randomly arranged.

4. The hologram recording method of claim 1 wherein when a length of one side of a pixel of the light image is d, the reversal regions have a cyclic period T which satisfies a condition: T>d.

5. The hologram recording method of claim 1 wherein when a length of one side of a pixel of the light image is d, the reversal regions have a cyclic period T which satisfies a condition: T>2d.

6. The hologram recording method of claim 1, wherein the reversal regions comprise a plurality of reversal regions in which different numbers of pixels are reversed.

7. The hologram recording method of claim 1, wherein the signal light comprises signal light in which, for an intensity distribution of the signal light that is spread in a substantially circular form about an optical axis, the reversal regions are arranged within a predetermined distance from the optical axis.

8. The hologram recording method of claim 1, wherein the digital data is two-dimensionally encoded with units in which light pixels or dark pixels are included among a plurality of dark pixels.

9. The hologram recording method of claim 8, wherein the reversal regions comprise unit blocks each of which comprises a two-dimensionally encoded unit or a plurality of units.

10. A hologram recording apparatus comprising:
an illumination light source that illuminates coherent light;
a spatial light modulator that has a structure in which a plurality of pixels that transmit or reflect the coherent light illuminated from the illumination light source are arrayed and modulates the coherent light for each pixel by transmitting or reflecting the coherent light;
a pattern generating unit that includes an input section at which digital data, including a light and dark pattern having a plurality of pixels, is inputted, an encoding section that two-dimensionally encodes the inputted data to generate the light and dark pattern, a reversal-processing section that forms a plurality of reversal regions in which lightness and darkness of the plurality of pixels of the light and dark pattern are reversed for the light and dark pattern, and a plurality of non-reversal regions in which lightness and darkness of the plurality of pixels of the light and dark pattern is not reversed, and an output section that outputs an output signal for displaying the reversal-processed light and dark pattern at the spatial light modulator;
a control unit that controls the pixels of the spatial light modulator in accordance with the output signal of the pattern generating unit so that signal light is generated by the spatial light modulator;
an optical system that Fourier-transforms the signal light generated by the spatial light modulator; and
an illuminating unit that illuminates the Fourier-transformed signal light and a reference light onto an optical recording medium.

11. The hologram recording apparatus of claim 10, wherein the reversal-processing section comprises:
a mask generating section that generates either a mask image in which mask portions corresponding to unit blocks each including one or more units for the two-dimensional encoding are periodically arrayed, or generates a mask image in which the mask portions are randomly arrayed; and
a mask processing section that reverses lightness and darkness of pixels of the light and dark pattern in accordance with the mask portions of the mask image.

12. An optical recording medium, recorded as a hologram, comprising:
a Fourier-transformed image of signal light including a plurality of arrayed reversal regions in which lightness and darkness of a plurality of pixels of a light and dark image is reversed for an intensity distribution of light representing digital data as the light and dark image, and a plurality of arrayed non-reversal regions in which lightness and darkness of the plurality of pixels of the light and dark image is not reversed.

13. The optical recording medium of claim 12, wherein the signal light comprises signal light in which the reversal regions are periodically arrayed.

14. The optical recording medium of claim 12, wherein the signal light comprises signal light in which the reversal regions are randomly arranged.

* * * * *